United States Patent
Nodelman et al.

(10) Patent No.: US 6,586,487 B1
(45) Date of Patent: Jul. 1, 2003

(54) LOW-DENSITY, WATER BLOWN POLYURETHANE FOAMS FOR ENERGY-ABSORBING APPLICATIONS

(75) Inventors: Neil H. Nodelman, Upper St. Clair, PA (US); David D. Steppan, Gibsonia, PA (US); Alan D. Bushmire, McDonald, PA (US); William E. Slack, Moundsville, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/614,612

(22) Filed: Jul. 12, 2000

(51) Int. Cl.[7] .............................................. C08G 18/28
(52) U.S. Cl. ..................... 521/130; 521/114; 521/115; 521/116; 521/117; 521/118; 521/129; 521/155; 521/159; 521/167; 521/170; 521/174
(58) Field of Search ................................ 521/130, 155, 521/159, 170, 174, 115, 116, 117, 118, 129, 167, 114

(56) References Cited

U.S. PATENT DOCUMENTS

| | | | |
|---|---|---|---|
| 3,723,392 A | 3/1973 | Konig et al. | |
| 3,795,636 A | 3/1974 | Huffman | |
| 5,219,893 A | 6/1993 | König et al. | 521/129 |
| 5,232,957 A | 8/1993 | Pritchard et al. | 521/174 |
| 5,300,534 A | * 4/1994 | Volkert et al. | 521/131 |
| 5,420,170 A | 5/1995 | Lutter et al. | 521/159 |
| 5,489,617 A | 2/1996 | Miller et al. | 521/112 |
| 5,578,653 A | * 11/1996 | Hendreich et al. | 521/114 |
| 5,847,014 A | 12/1998 | Nodelman et al. | 521/110 |

FOREIGN PATENT DOCUMENTS

| | | | |
|---|---|---|---|
| EP | 0367283 | * | 5/1990 |
| EP | 0 572 833 | | 12/1993 |

OTHER PUBLICATIONS

D.L. Sounik, D.W. McCullough, J.L. Clemons & J.L. Liddle, Dynamic Impact Testing of Polyurethane Energy Absorbing (EA) Foams, SAE Technical Paper Series 940879, Feb. 28–Mar. 3, 1994–pp. 1–11.

* cited by examiner

Primary Examiner—John M. Cooney, Jr.
(74) Attorney, Agent, or Firm—Joseph C. Gil; John F. Mrozinski, Jr.; Diderico van Eyl

(57) ABSTRACT

A method for making an energy-absorbing foam having a density that is less than about 7 pcf that exhibits excellent strength properties and that is particularly suitable for automobile bumper applications. The invention is also directed to the energy-absorbing foam made with the method.

11 Claims, No Drawings

LOW-DENSITY, WATER BLOWN POLYURETHANE FOAMS FOR ENERGY-ABSORBING APPLICATIONS

FIELD OF THE INVENTION

The invention relates to the field of polyurethane foams.

BACKGROUND OF THE INVENTION

Automobile bumpers serve the primary purpose of protecting other functional parts of the automobiles upon collision. Automobile bumpers and other effective energy-absorbing devices should be capable of yielding on impact and recovering, either partially or completely, after the impact. Also, such structures must also satisfy size and weight limitations usually imposed by vehicle or other equipment manufacturers as well as any existing or proposed government performance standards.

It is well known in the art that there has been an ongoing need to develop an energy-absorbing polyurethane foam, useful in automobile bumpers, that exhibits both favorable strength properties at relatively lower densities than ordinary polyurethane foams.

It is the object of the present invention to provide a polyurethane material with a combination of such favorable properties.

SUMMARY OF THE INVENTION

The present invention, meeting the above-mentioned need, is directed to a method for making an energy-absorbing foam having a density that is less than about 7 pcf that exhibits excellent strength properties and that is particularly suitable for automobile bumper applications. The method generally involves the steps of reacting (a) a polyisocyanate component selected from the group consisting of polymeric diphenylmethane diisocyanate, mixtures of polymeric diphenylmethane diisocyanate (PMDI) and MDI, and, mixtures of polymeric diphenylmethane diisocyanate and allophanate-modified MDI and/or a urethane-modified MDI (a prepolymer, available as Mondur PF from Bayer Corporation) and (b) a polyol component. The polyol component includes (1) from about 12 to about 45 parts by weight of a diol having a molecular weight that is less than 300; (2) a crosslinker component having a functionality that is greater than 2, a molecular weight ranging from about 92 to about 1000, wherein the OH equivalent of the diol to the OH equivalent of the crosslinker is from about 1 to about 10; (3) from about 40 to about 75 parts of a polyether component having a functionality of from about 1.5 to about 3.5 and a molecular weight of from about 2000 to about 12,000; (4) from about 0.1 to about 3.0 parts of a cell-opening surfactant; and (5) from about 1 to about 3 parts water, based on 100 parts of the polyol component, wherein the amounts of components 1), 2), 3) and 4) total 100 parts. These and other features, aspects, and advantages of the present invention will become better understood with reference to the following description and appended claims.

DESCRIPTION OF THE INVENTION

The polyisocyanates which may be used in the present invention are modified and unmodified polyisocyanates which are well known to those skilled in the art. Generally, the polyisocyanate component includes polymeric diphenylmethane diisocyanate (polymeric MDI). Preferably, the polyisocyanate component includes mixtures of polymeric MDI and other isocyanates selected from the following: 4,4'-diphenylmethane diisocyanate (MDI), mixtures of 4,4'- and 2,4'-diphenylmethane diisocyanate, modified diphenyl diisocyanate prepolymers, including allophanate-modified MDI. The NCO functionality of these isocyanates generally ranges from at least 2. In one embodiment, the isocyanate component has an NCO functionality that ranges from about 2.3 to about 2.7. These isocyanates are well known and available from commercial vendors such as Bayer Corporation. The polyisocyanate component is generally present in an amount such that the NCO:OH index is at least about 0.8.

The polyol component generally includes from about 12 to about 45 parts by weight of a diol having a molecular weight that is less than 300. Mixtures of different compounds containing two hydroxyl groups and having molecular weight of less than about 300 may also be used. Examples of such low molecular weight compounds are ethylene glycol, 1,2- and 1,3-propylene glycol, 1,4- and 2,3-butylene glycol, 1,5-pentane. diol, 1,6-hexane diol, 1,8-octane diol, neopentyl glycol, 1,4-bis-hydroxy-methyl cyclohexane, 2-methyl-1,3-propane diol, dibromobutane diol (U.S. Pat. No. 3,723,392), diethylene glycol, dipropylene glycol. 2-Methyl-1,3-propane diol is a preferred diol.

The crosslinker component of the polyol component generally has a functionality that is greater than 2, a molecular weight ranging from about 92 to about 1000, such that the OH equivalent of the diol to the OH equivalent of the crosslinker is from about 1 to about 10. Examples of suitable crosslinkers include known polyols such as glycerol, trimethylol-propane, 1,2,6-hexanetriol, 1,2,4-butanetriol, trimethylolethane, as well as appropriate hydroxyl-containing polyethers, polyesters, polyacetals, polycarbonates, polyesterethers, polythioethers, polyamides, polyesteramides, polysiloxanes, polybutadienes, and polyketones. A preferred crosslinker includes a propylene oxide/ethylene diamine adduct having an OH number of from about 450 to about 850.

The polyether component includes a polyether, or a mixture of polyethers, that are generally present in an amount ranging from about 40 to about 75 parts and has a functionality of from about 1.5 to about 4 and a molecular weight of from about 2000 to about 8000. These polyethers may be formed as the reaction product of one or more alkylene oxides, such as ethylene oxide, propylene oxide, butylene oxide, or mixtures of two or more such oxides, with an active hydrogen-containing initiator having a functionality of 2 or more. A non-limiting example of a commercially-available diol that may be used as the first polyol in accordance with the present invention includes MULTRANOL 9111, available from Bayer Corporation.

The silicone cell-opening surfactants, which are used in amounts of from about 0.1 to about 3 parts, are known in the art. Polyether siloxanes are particularly suitable silicone cell-opening surfactants. These compounds generally have a polydimethyl siloxane group attached to a copolymer of ethylene oxide and propyene oxide. Examples of useful cell-opening silicone surfactants include those sold as L-3801 and L-3802 from WITCO.

Preferably, the surfactants of the present invention have the generalized average formula $M^*D_x D''_y$, $M^*$ in which $M^*$ is $(CH_3)_3 SiO_{1/2}$ or $R(CH_3)_2 SiO_{1/2}$;

D is $(CH_3)_2 SiO_{2/2}$;

D" is $(CH_3)(R)SiO_{2/2}$;

x is 81–220, y is 8–40 and $D/(D''+M'') \leq 10$ (in which M" is $R(CH_3)_2 SiO_{1/2}$);

R is a polyether-containing substituent derived from a blend of certain polyethers selected from two different, groups such that the average molecular mass is 1100–1800. Such surfactants generally have an average molecular weight that is more than about 9,000 and a silicone-polyoxyalkylene oxide copolymer that is composed of two polyethers. Such surfactants are known and can be prepared in accordance to the method discussed in U.S. Pat. No. 5,489,617, incorporated herein by reference in its entirety.

The reaction mixture also contains at least one tertiary amine catalyst for catalyzing the reaction between isocyanate groups and hydroxyl groups (i.e., a urethane catalyst) in an amount of from about 0.2 to about 3 parts. These catalysts are, generally known and include tertiary amines such as triethylamine, tributylamine, N-methylmorpholine, N-ethylmorpholine, N-coco-morpholine, N,N,N',N"-tetramethylethylene-diamine, 1,4-diaza-bicyclo-(2,2,2)-octane, N-methyl-N'-dimethyl-amino-ethylpiper-azine, N,N-dimethylbenzylamine, bis-(N,N-diethyl-aminoethyl)-adipate, dimethyl ethanolamine, the formic salt of bis dimethylamino ethyl ether, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole and the like. Also useful are the commercially available tertiary amines such as Niax A1 and Niax A107, available from WITCO; Thancat DD, available from Texaco; and the like. Delayed action or heat-activated amine catalysts, e.g., amine catalysts that are blocked with an acid such as formic acid, can also be used. Water is used in an amount ranging from about 1 to about 3 parts, based on 100 parts of the polyol component, wherein the amounts of components (1), (2), (3) and (4) total 100 parts.

Optionally, an organometallic catalyst can be used in an amount of from about 0.01 to about 0.5 parts. Some examples of suitable organo-metallic catalysts include, for example, organometallic compounds of tin. Suitable organotin catalysts include compounds such as tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts can also be used. Such catalysts can be selected from catalysts such as dibutyltin dimercaptide, dibutyltin diisooctyl-mercaptoacetate, dimethyltin dimercaptide, dibutyltin dilaurylmercaptide, dimethyltin dilaurylmercaptide, dimethyltin diisooctyl-mercaptoacetate, di(n-butyl )tin bis (isooctylmercaptoacetate), and di(iso-octyl)tin bis(isooctyl-mercapto-acetate), all of which are commercially available from Witco Chemical Corp.

The energy-absorbing properties of the foams can be evaluated by determining the compressive strength and dynamic impact properties of the foams. The compressive strength of a foam can be determined with any suitable method, e.g., according to known ASTM tests with Instron tension devices. To determine dynamic impact properties of a foam, for instance, a specially-designed dynamic impact sled can be used in accordance to the process discussed in U.S. Pat. No. 5,847,014 and further discussed in D. F. Sounik, D. W. McCullough, J. L. Clemons, and J. L. Liddle, Dynamic Impact Testing of Polyurethane Energy-Absorbing (EA) Foams, SAE Technical Paper No. 940879, (1994), incorporated herein by reference in its entirety. Dynamic impact properties include the maximum impact force transmitted by a foam sample and the maximum deflection, the total distance that the impacting tip of a sled penetrates the foam sample. Generally, the higher the deflection, the weaker (or softer) the foam. The residual energy of the sled manifests itself as the maximum force at the maximum deflection when the sled and the compressing foam slam against a restraining wall. Generally, softer foams exhibit higher maximum impact forces since such foams do not absorb the energy of the impacting sled as much as foams with better energy-absorbing properties.

The invention provides previously unavailable advantages. The polyurethane foams of this invention have high energy-absorbing properties at lower densities, as compared to commercial polyurethane foams. It is now possible to obtain a reduction in polyurethane density, e.g., up to about 20%, without loss or impact properties.

The foams of the invention exhibit excellent properties and it is possible to make automobile bumpers that satisfy size and weight limitations usually imposed by vehicle or other equipment manufacturers as well as government performance standards. Automobile bumpers made with the foam of the invention provides excellent energy-absorbing properties and are capable of yielding on impact and recovering, either partially or completely, after the impact. It is understood that although the invention is preferably directed to a foam (and a method for making the foam) that is useful in automobile bumpers, the foam can be used in other applications.

The invention is further described in the following illustrative examples in which all parts and percentages are by weight unless otherwise indicated.

EXAMPLES

Materials

The following materials were used in the examples:

A) a non-filled polyether polyol based on glycerin, propylene oxide, and ethylene oxide (17% by weight) with a 35 OH No. available as Multranol 9143 from Bayer Corporation;

B) a 4000 molecular weight polyether, based on propylene glycol, propylene oxide and ethylene oxide (20% by weight), having a viscosity at 25° C. of 720–920 cps, available as Multranol 9111 from Bayer Corporation;

C) a propylene oxide/ethylene diamine adduct having an OH number of 630, available as Multranol 4050 from Bayer Corporation;

D) MP-diol, 2-methyl-1,3-propanediol;

E) DETDA, diethyltoluenediamine

F) TEOA: triethanolamine (an adduct of ammonia and 3 moles of ethylene oxide).

G) DEOA: diethanolamine (Adduct of ammonia and 2 moles of ethylene oxide).

H) water

I) a silicone surfactant, available as L-3801 from WITCO;

J) a silicone surfactant, available as L-3802 from WITCO;

K) 70% Bis(dimethyaminoethyl) ether, available as Niax A-1 from WITCO;

L) a 70/30 mixture of polymeric diphenylmethane diisocyanate (polymeric MDI) (Mondur MR)and a modified diphenyl methane diisocyanate prepolymer, available as Mondur PF from Bayer Corporation.

M) polymeric diphenylmethane diisocyanate(polymeric MDI) available as Mondur MR, from Bayer Corporation;

N) a 90/10 mixture of polymeric diphenylmethane diisocyanate-(polymeric MDI) (Mondur MR) and a modified diphenyl methane diisocyanate prepolymer, available as Mondur PF from Bayer Corporation.

O) a 74/26 mixture containing polymeric MDI, available as Mondur MR, from Bayer Corporation, and a 27% NCO isobutanol-based allophanate-modified MDI.

Formulations were made by combining the respective components of a polyisocyanate component and an isocyanate-reactive component with simple mixing techniques.

To make the foamed blocks, a high pressure foam machine, used to make 10"×10"×2.5" molded blocks, was equipped with two (2) REXROTH 12 axial piston pumps and a HENNECKE mQ-8 mixhead. The parts were made in an open-pour process in an aluminum mold. The injection pressure was 135 bar on the polyol side and 145 bar on the isocyanate side. The throughput in the mixhead was maintained at 136 g/sec. The polyol blend was made in the proportions indicated and heated, along with the isocyanate to a temperature of 30° C. All the blocks were demolded after three minutes and Chemtrend RCTW A-6040 was used as the external release agent.

Table 1 below indicates the formulations that were used in the indicated examples. The formulation used in the control example is a standard formulation that is used to make energy-absorbing foams. Table 2 indicates the NCO:OH index that was used as well as the molded density of the foams that were prepared.

TABLE 1

| Material | Control | Example 1 | Example 2 | Example 3 |
|---|---|---|---|---|
| A | 70.8 | | | |
| B | | 62.1 | 62.5 | 62.2 |
| C | 20.0 | 12.0 | 12.0 | 12.0 |
| D | | 21.2 | 21.0 | 21.5 |
| E | 2.5 | | | |
| F | 2.3 | | | |
| G | 2.5 | 0.5 | 0.5 | 0.5 |
| H | 1.8 | 1.5 | 1.8 | 1.6 |
| I | | 1 | 1 | 1 |
| J | | 0.2 | 0.2 | 0.2. |
| K | 0.2 | 1.0 | 1.0 | 1.0 |
| L | 91.4 | | | |
| M | | 112.0 | | |
| N | | | 119.0 | |
| O | | | | 118.6 |

TABLE 2

| | Control | Ex. 1 | Ex. 2 | Ex. 3 |
|---|---|---|---|---|
| NCO:OH Index | 102 | 102 | 102 | 102 |
| Molded Density, pcf | 7 | 5.5 | 5.5 | 5.5 |

To determine the compressive strength of the foams, the Quasistatic compression (compressive strength) (CLD 50% full block (psi)) was tested according to ASTM D 1621-94, modified for full-block measurement, using an Instron 4200 series tension apparatus with a 10,000 lb. compression cell. Generally, the higher the number, the more compressive strength the foam had.

To determine dynamic impact properties of the foams, a specially-designed dynamic impact sled in accordance to the process is discussed in D. F. Sounik, D. W. McCullough, J. L. Clemons, and J. L. Liddle, Dynamic Impact Testing of Polyurethane Energy-Absorbing (EA) Foams, SAE Technical Paper No. 940879, (1994). The dynamic impact sled was designed by Hennecke Machinery Group and was a horizontal high-speed dynamic impact sled designed to impact a foam sample at speeds up to 33 mph. In the examples, the movable sled (tup) was cylindrical and weighed 132 lbs (59.4 kg). Table 3 shows physical properties of the foams. Table 4 shows the sled impact properties of the foams.

The results on Table 3 show that the foams prepared in accordance with the invention (Examples 1–3) had a higher compression strength as compared to the foams made in the control experiment, despite having a lower density.

The results on Table 4 show that the maximum deflection of the foams made in accordance with the invention had a lower maximum deflection as compared to the foam made in the control experiment. Since the higher the deflection, the weaker (or softer) the foam, the foams made in accordance with the invention exhibited, remarkable energy-absorbing properties despite having lower densities. Also, the results indicate that the foams made in accordance with the invention had similar resilience to the foam made in the control experiment.

It was observed that the efficiencies of the foams made in accordance with the invention, 82.9, 82.5, and 83.2% were similar to 85%, the efficiency obtained for the foam made with the control example. Such relatively low efficiencies (as compared to an efficiency of about 100%) indicates that the foams were resilient, a desired property for automobile bumper applications. Also, it was observed that the final thickness of the foams made in accordance to the,invention was similar to the thickness of the foams made under the control example. Such similar thicknesses indicated that the foams made in accordance to the invention recovered well after impact.

TABLE 3

| Physical Property | Control | Ex. 1 | Ex. 2 | Ex. 3 |
|---|---|---|---|---|
| Core Density, pcf ASTM D 3574A | 6.28 | 5.08 | 4.96 | 5.09 |
| Open Cell, % | 7.3 | 18.6 | 12.1 | 14.9 |
| Compression Strength psi | | | | |
| 10% | 45.91 | 51.04 | 54.03 | 51.63 |
| 50% | 65.11 | 60.49 | 62.49 | 61.58 |
| 70% | 108.81 | 106.83 | 107.31 | 108.55 |
| Tensile Strength, psi ASTM D 3574E | 73.0 | 80.9 | 77.7 | 76.0 |
| Elongation, % | 12.8 | 12.4 | 11.1 | 11.4 |
| Die "C" Tear, pli ASTM D 624 | 8.5 | 9.3 | 10.8 | 10.9 |

TABLE 4

SLED IMPACT Cylindrical Head (6") 132 lb tup at 13 mph

| | Control | Ex. 1 | Ex. 2 | Ex. 3 |
|---|---|---|---|---|
| Max Force, lbs. | 8358 | 7733 | 7844 | 7965 |
| Max Deflection, in. | 1.98 | 1.96 | 1.93 | 1.90 |
| Efficiency, % | 85.3 | 82.9 | 82.5 | 83.2 |
| Cracked after impact | 3 out of 5 | 5 out of 5 | 3 out of 5 | 0 out of 5 |
| Block thickness after impact, in. | 2.30 | N/A | 2.30 | 2.25 |

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A method for making an energy-absorbing foam having a density that is less than about 7 pcf comprising the steps of reacting:
   (a) a polyIsocyanate component comprising a member selected from the group consisting of polymeric diphenylmethane diisocyanate, mixtures of polymeric diphenylmethane diisocyanate and diphenylmethane diisocyanate, mixtures of polymeric diphenylmethane dilsocyanate and allophanate-modified diphenylmethane diisocyanate; with
   (b) a polyol component comprising
      (1) from about 12 to about 45 parts by weight of a diol having a molecular weight that is less than 300;
      (2) a crosslinker component having a functionality that is greater than 2, a molecular weight ranging from about 92 to about 1000, wherein the OH equivalent of the diol to the OH equivalent of the crosslinker is from about 1 to about 10;
      (3) from about 40 to about 75 parts of a non-filled polyether component having a functionality of from about 1.5 to about 4 and a molecular weight of from about 2000 to about 12,000;
      (4) from about 0.1 to about 3.0 parts of a cell-opening surfactant of the formula $M^*D_x D''_y M^*$
      in which
      $M^*$ represents $(CH_3)_3 SiO_{1/2}$ or $R(CH_3)_2 SiO_{1/2}$,
      D represents $(CH_3)_2 SiO_{2/2}$, and
      D" represents $(CH_3)(R)SiO_{2/2}$,
      wherein x is 81–220, y is 8–40 and $D/(D''+M'') \leq 10$, in which M" represents $R(CH_3)_2 SiO_{1/2}$; R represents a polyether-containing substituent derived from a blend of certain polyethers selected from two different groups in which the average molecular mass is 1100–1800;
      (5) from about 1 to about 3 parts water, based on 100 parts of the polyol component, wherein the amounts of components (1), (2), (3) and (4) total 100 parts; and
      (6) a tertiary amine catalyst in an amount about 0.2 to about 3.0 parts.

2. The method of claim 1, wherein the diol comprises a member selected from the group consisting of ethylene glycol, 1,2-propylene glycol, 1,3-propylene glycol, 1,4-butylene glycol, 2,3-butylene glycol, 1,5-pentane diol, 1,6-hexane diol, 1,8-octane diol, neopentyl glycol, 1,4-bishydroxymethyl cyclohexane, 2-methyl-1,3-propane diol, dibromobutane diol, diethylene glycol, and dipropylene glycol.

3. The method of claim 1, wherein the crosslinker component comprises a member selected from the group consisting of glycerol, trimethylolpropane, 1,2,6-hexanetriol, 1,2,4-butanetriol, trimethylolethane, hydroxyl-containing polyethers, polyesters, polyacetals, polycarbonates, polyesterethers, polythioethers, polyamides, polyesteramides, polysiloxanes, polybutadienes, and polyacetones.

4. The method of claim 1, wherein the tertiary amine component comprises a member selected from the group consisting of triethylamine, tributylamine, N-methylmorpholine, N-ethyl-morpholine, N-cocomorpholine, N,N,N',N"-tetramethyl-ethylene-diamine, 1,4-diaza-bicyclo-(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyldiethylenetriamine, N,N-dimethylcyclohexylamine, dimethyl ethanolamine, the formic salt of bis dimethylamino ethyl ether, N,N,N',N'-tetramethyl-1,3-butanediamine, N,N-dimethyl-β-phenylethylamine, 1,2-dimethylimidazole, 2-methylimidazole, and delayed action or heat-activated amine catalysts.

5. The method in claim 1, wherein the polyol component further comprises from about 0.01 to about 0.5 parts of an organotin catalyst.

6. An energy-absorbing foam comprising the reaction product of:
   (a) a polyisocyanate component comprising a member selected from the group consisting of polymeric diphenylmethane diisocyanate, mixtures of polymeric diphenylmethane diisocyanate and diphenylmethane diisocyanate, and mixtures of polymeric diphenylmethane diisocyanate and allophanate-modified diphenylmethane diisocyanate; and
   (b) a polyol component comprising
      (1) from about 12 to about 45 parts by weight of a diol having a molecular weight that is less than 300;
      (2) a crosslinker component having a functionality that is greater than 2, a molecular weight ranging from about 92 to about 1000, wherein the OH equivalent of the diol to the OH equivalent of the crosslinker is from about 1 to about 10;
      (3) from about 40 to about 75 parts of a non-filled polyether component having a functionality of from about 1.5 to about 3.5 and a molecular weight of from about 2000 to about 12,000;
      (4) from about 0.1 to about 3.0 parts of a cell-opening surfactant of the formula $M^*D_x D''_y M^*$
      in which
      $M^*$ represents $(CH_3)_3 SiO_{1/2}$ or $R(CH_3)_2 SiO_{1/2}$,
      D represents $(CH_3)_2 SiO_{2/2}$, and
      D" represents $(CH_3)(R)SiO_{2/2}$,
      wherein x is 81–220, y is 8–40 and $D/(D''+M'') \leq 10$, in which M" represents $R(CH_3)_2 SiO_{1/2}$; R represents a polyether-containing substituent derived from a blend of certain polyethers selected from two different groups in which the average molecular mass 1100–1800;
      (5) from about 1 to about 3 parts water, based on 100 parts of the polyot component, wherein the amounts of components 1), 2), 3) and 4) total 100 parts; and
      (6) a tertiary amine catalyst in an amount about 0.2 to about 3.0 parts.

7. The energy-absorbing foam of claim 6, wherein the diol comprises a member selected from the group consisting of ethylene glycol, 1,2-propylene glycol, 1,3-propylene glycol, 1,4-butylene glycol, 2,3-butylene glycol, 1,5-pentane, diol, 1,6-hexane diol, 1,8-octane diol, neopentyl glycol, 1,4-bishydroxymethyl cyclohexane, 2-methyl-1,3-propane diol, dibromobutane diol, diethylene glycol, and dipropylene glycol.

8. The energy-absorbing foam of claim 6, wherein the crosslinker component comprises a member selected from the group consisting of glycerol, trimethylolpropane, 1,2,6-hexanetriol, 1,2,4-butanetriol, trimethylolethane, hydroxyl-containing polyethers, polyesters, polyacetals, polycarbonates, polyesterethers, polythioethers, polyamides, polyesteramides, polysiloxanes, polybutadienes, and polyacetones.

9. The energy-absorbing foam of claim 6, wherein the tertiary amine component comprises a member selected from the group consisting of triethylamine, tributylamine, N-methylmorpholine, N-ethyl-morpholine, N-coco-morpholine, N,N,N',N''-tetramethyl-ethylene-diamine, 1,4-diaza-bicyclo-(2,2,2)-octane, N-methyl-N'-dimethyl-amino-ethylpiperazine, N,N-dimethylbenzylamine, bis-(N,N-diethyl-aminoethyl)-adipate, N,N-diethylbenzylamine, pentamethyidiethylenetriamine, N,N-dimethyl-cyclohexylamine, dimethyl ethanolamine, the formic salt of bis dimethylamino ethyl ether, N,N,N',N'-tetramethyl-1,3-butanediamine, N,N-dimethyl-β-phenylethylamine, 1,2-dimethylimidazole, 2-methylimidazole, and delayed action or heat-activated amine catalysts.

10. The energy-absorbing foam of claim 6, wherein the polyol component further comprises from about 0.01 to about 0.5 parts of an organotin catalyst.

11. An automobile bumper comprising the energy-absorbing foam of claim 6.

* * * * *